United States Patent [19]

Takahashi

[11] Patent Number: 4,590,566

[45] Date of Patent: May 20, 1986

[54] SYSTEM FOR DIAGNOSING AN INTERNAL COMBUSTION ENGINE

[75] Inventor: Toshio Takahashi, Mitakashi, Japan

[73] Assignee: Fuji Jukogyo Kabushiki Kaisha, Tokyo, Japan

[21] Appl. No.: 536,014

[22] Filed: Sep. 26, 1983

[30] Foreign Application Priority Data

Oct. 1, 1983 [JP] Japan .................................. 57-173629

[51] Int. Cl.⁴ ............................................. F02D 35/00
[52] U.S. Cl. ................................. 364/431.11; 123/479
[58] Field of Search .................... 364/431.01, 431.03, 364/431.11; 123/479, 491; 73/119 A, 117.3; 340/52 F, 52 R, 62

[56] References Cited

U.S. PATENT DOCUMENTS

| | | | |
|---|---|---|---|
| 4,325,251 | 4/1982 | Kanegae | 73/117.3 |
| 4,393,842 | 7/1983 | Otsuka et al. | 123/479 |
| 4,395,905 | 8/1983 | Fujimori et al. | 73/119 A |
| 4,430,979 | 2/1984 | Shikata | 123/479 |
| 4,502,446 | 3/1985 | Kanegae et al. | 123/479 |

Primary Examiner—Parshotam S. Lall
Attorney, Agent, or Firm—Martin A. Farber

[57] ABSTRACT

A system for diagnosing an internal combustion engine having a starter and a starter operation switch. The system comprises a starter operation diagnosing circuit responsive to output voltage of the starter operation switch for producing an output when the output voltage deflects from a predetermined value, an engine speed detecting circuit for detecting an engine speed at cranking of the engine, a first gate responsive to the output voltage of the detecting circuit for producing an output for a predetermined time. A second gate is responsive to the output of the first gate to pass the output of the starter operation diagnosing circuit, and a warning lamp is operated by a signal passing through the second gate.

3 Claims, 3 Drawing Figures

| I | II | III | IV | V | VI | VII |
|---|---|---|---|---|---|---|
| H | L | H | L | H | H/L | H/L |
| H | H | L | TsecH | TsecH | H/L | TsecH/L |
| L | L | H | L | H | H/L | H/L |
| L | H | H | L | H | H/L | H/L |

FIG. 3

SYSTEM FOR DIAGNOSING AN INTERNAL COMBUSTION ENGINE

BACKGROUND OF THE INVENTION

The present invention relates to a diagnosis system for internal combustion engines, and more particularly to a system for diagnosing failure of a starter operation switch of an engine mounted on a motor vehicle and for displaying its failure.

An electronic fuel-injection system of the type which is provided with a computer to compute various factors such as starter operation, throttle position, volume of intake airflow, intake manifold vacuum and coolant temperature in order to produce output signals for driving solenoid-operated fuel injector is known. The starter operation switch is provided to produce a starter signal, when a starter for the engine is operated. At cold engine, air-fuel mixture is enriched by the starter signal and coolant temperature signal. If trouble occurs in the starter operation switch system, the starter signal is not applied to the computer. Consequently, the control operation for the fuel injector is not properly carried out, resulting in failure of engine starting. In order to avoid such failure, a fail-safe operation system should be provided to ensure the starting of the engine, even if the starter signal is not fed to the computer. Further, a warning system for the failure of the starter operation switch system must be provided. However, if the driver of the vehicle does not notice the warning of the failure during the starting of the engine, the warning is not given to the driver until the subsequent starting of the engine. Since the sensor system is left in failure, the engine may not be started the next time.

SUMMARY OF THE INVENTION

It is an object of the present invention to provide a system for diagnosing a starter operation switch system and for warning of failure of the starter operation switch for a proper period of time.

Another object of the present invention is to provide a system which displays a failure of the starter operation switch at inspection in a shop during the operation of the engine.

According to the present invention, there is provided a system for diagnosing an internal combustion engine having a starter and a starter switch effective to produce a starter signal dependent on the operation of the starter switch, and first means for generating an engine speed signal dependent on engine speed, the improvement comprising a first comparator responsive to the engine speed signal for detecting the engine speed during cranking of the engine and producing a cranking signal; starter operation diagnosing circuit means responsive to the starter signal of said starter switch for producing a failure output when an absence of the starter signal during a presence of the cranking signal continues for a predetermined period; a second comparator for producing an engine operating signal when the engine speed signal exceeds idling speed; a terminal for grounding a circuit and for producing a grounding signal during the grounding; first gate means responsive to said engine operating signal of said second comparator and to the grounding signal for producing a first signal having a first logic level during the presence of the grounding signal and a second signal having a different, second logic level during the absence of the grounding signal and during the presence of the engine operating signal; second means responsive to the second signal having the second logic level for producing a third signal; second gate means for providing a fourth signal upon occurrence of said failure output of said starter operation diagnosing circuit means and the first signal having the first logic level and respectively said second signal; and warning means operated by said fourth signal from said second gate means.

The present invention will be more apparent form the following description made with reference to the accompanying drawings.

BRIEF DESCRIPTION OF DRAWINGS

FIG. 3 is a truth table of the circuit of FIG. 2.

DETAILED DESCRIPTION OF THE PREFERRED EMBODIMENT

Figure 1:
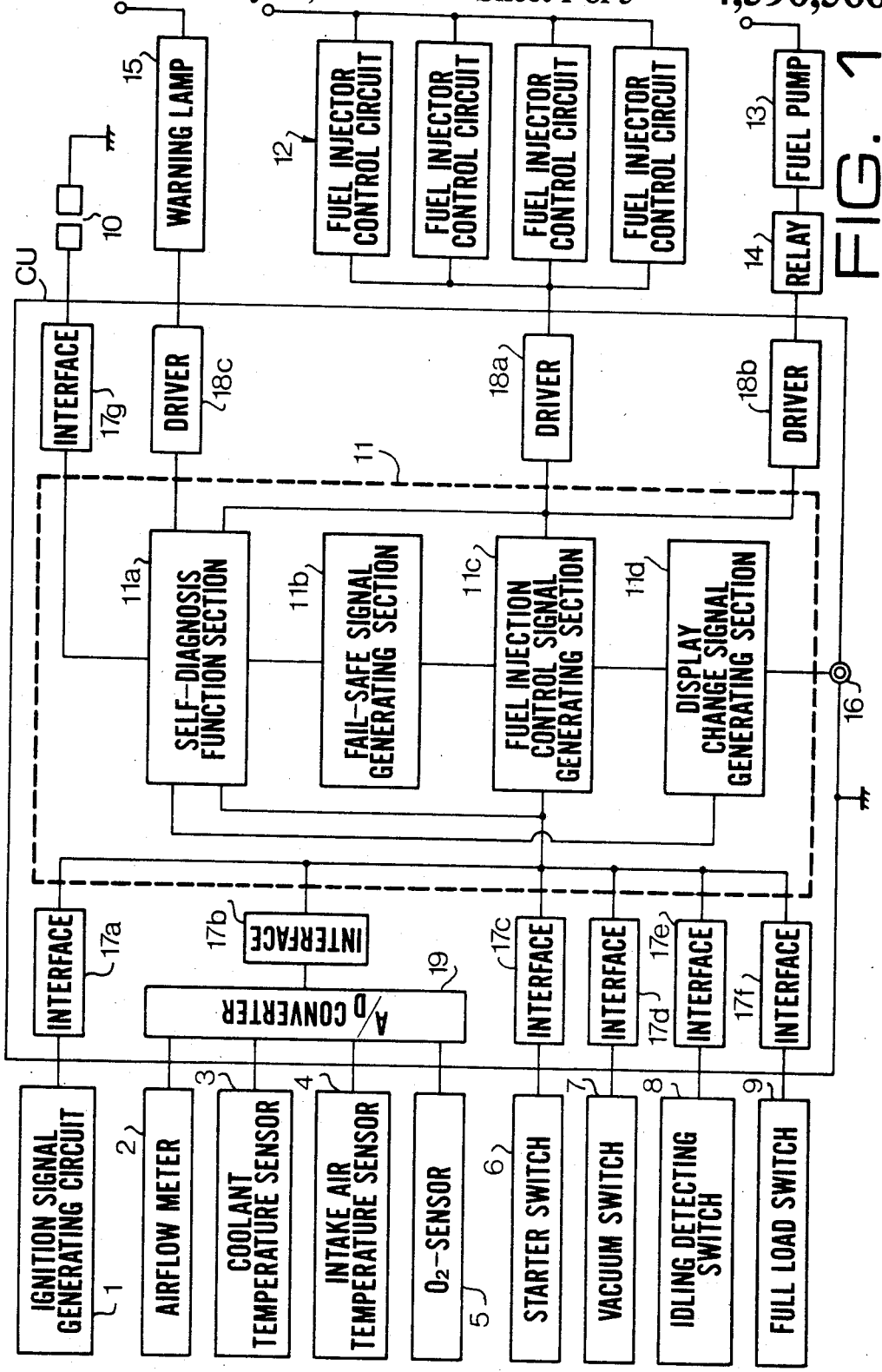
FIG. 1 is a block diagram showing a diagnosis system for operation of an engine.

FIG. 1 diagrammatically shows a diagnosis system for operation of an engine including a system of the present invention. The system comprises an engine operation detecting means group 1 to 9, and a control unit CU. The control unit CU comprises an interface group 17a to 17g, drivers 18a to 18c a computer 11 including a function group 11a to 11d such as memories, I/O and timers. The detecting means group comprises an ignition signal generating circuit 1, output signal of which represents an ignited cylinder of the engine and ignition timing thereof, an airflow meter 2, a coolant temperature sensor 3, an intake air temperature sensor 4, and an $O_2$-sensor 5 for detecting oxygen concentration in exhaust gases. The detecting means group further comprises a starter operation switch 6 for detecting operation of a starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking of fault. When the terminal 10 is connected to the ground at a shop, fault condition memorized in the display change signal generating section 11d during the driving of a motor vehicle is displayed by the lamp 16. During the drive of the motor vehicle, the terminal 10 is disconnected from the ground. The output of the ignition signal generating circuit 1 is applied to self-diagnosis section 11a and fuel injection control signal generating section 11c through the interface 17a. Outputs of airflow meter 2 and sensors 3 to 5 are applied to section 11a and 11c through an A/D converter 19 and the interface 17b. Further, outputs of switches 6 to 9 are applied to sections 11a and 11c through interfaces 17c to 17f, respectively.

The self-diagnosis function section 11a monitors inputs from the engine operation detecting means group 1 to 9 and when any fault is detected, a signal is sent to a warning lamp 15 through the driver 18c to warn the fault. Further, when such a serious engine trouble that will stall the engine occurs, the self-diagnosis function section 11a sends a diagnosis signal dependent on the kind of the engine trouble to the fail-safe signal generating section 11b. The fail-safe signal generating section 11b has memory in which a plurality of information or data are stored to avoid the engine stall caused by the engine trouble and produces a fail-safe signal dependent on the diagnosis signal. The fail-safe signal is fed to the fuel injection control signal generating section 11c which operates to stop the input from the detecting means group 1 to 9.

In normal engine operation, the fuel injection control signal generating section 11c operates to produce an air-fuel ratio control signal by computing inputs applied from the engine operation detecting means group 1 to 9. The air-fuel ratio control signal is fed to a fuel pump 13 through the driver 18b and a relay 14 and to fuel injector control circuits 12 through the driver 18a so as to inject a proper amount of fuel at a proper time. Further, the fuel injection control signal generating section 11c sends a signal to display change signal generating section 11d in response to an input from the $O_2$-sensor 5. The switching section 11d sends a signal to the monitor lamp 16 in response to the signal from the fuel injection control signal generating section 11c to indicate a fact that normal oxygen concentration is included in exhaust gases.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to fuel injection control circuits 12, so that the engine continues to operate in accordance with the quasi signal without stalling.

Further, the section 11d sends a signal to the lamp 16 in dependency on the diagnosis signal fed from the self-diagnosis function 11a. The lamp 16 intermittently lights in accordance with a pattern which is decided by the diagnosis signal by connecting the terminal 10 to the ground at a shop. An inspector in the shop can know the kind of the engine trouble by the pattern of the lighting of the lamp 16.

In accordance with the present invention, when fault occurs in the starter operation sensor system, the self-diagnosis function section 11a generates a signal and the signal is fed to the fail-safe signal generating section 11b.

Figure 2:
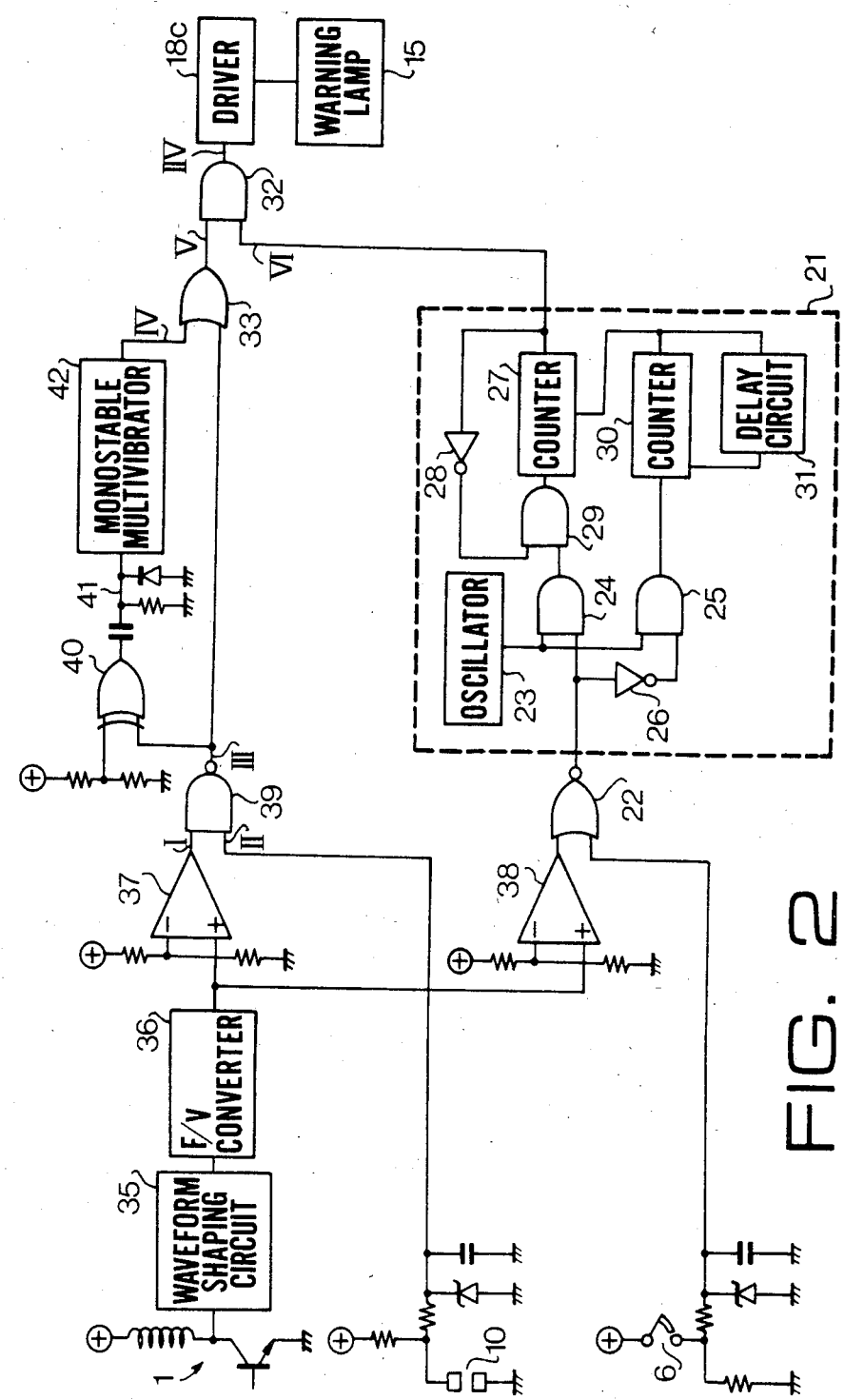
FIG. 2 is a starter operation switch diagnosing circuit according to the present invention.

FIG. 2 shows a diagnosing circuit for the starter operation sensor system, which is included in the self-diagnosis function section 11a (FIG. 1). The output of the starter operation switch 6 is fed to a diagnosing circuit 21 through a NOR gate 22.

The output of the NOR gate 22 is applied to an AND gate 24 and also to an AND gate 25 through an inverter 26. The output of the AND gates 24 and 25 are applied with pulses from an oscillator 23 to produce pulses in dependency on the outputs of the NOR gate 22.

The diagnosing circuit 21 is provided with a counter 27 for detecting trouble of the switch 6 and a counter 30 for resetting the counter 27.

If trouble occurs in the starter operation switch 6 and the output of the switch is at a low level, the output voltage of the NOR gate 22 is at a high level. The high level output of the NOR gate 22 is applied to AND gate 24, so that AND gate 24 produces pulses. The pulses are applied to the counter 27 through an AND gate 29. When the count of the counter 27 exceeds a set count, the counter 27 produces a high level output. The output of the counter 27 is applied to the other input of the AND gate 29 through an inverter 28, so that the AND gate 29 is closed to check input pulses from the output of the AND gate 24 so as to hold the high level output of the counter 27. The output of the counter 27 is applied to an AND gate 32.

It is necessary to reset counter 27, if the trouble in the starter operation switch 6 recovers after a short time. Counter 30 is to reset the counter 27. The output of NOR gate 22 is at a low level during normal operating condition, so that AND gate 25 is opened to produce pulses. When the number of pulses applied to conter 30 reaches a predetermined value which corresponds to the above described short time, counter 30 produces an output. The output is applied to reset terminal of counter 27 to reset it and is also applied to its own reset terminal through a delay circuit 31. Thus, the reset operation of the counters 27 and 30 is repeated as long as the starter operation switch 6 is in normal condition.

On the other hand, ignition pulses generated by the ignition pulse generating circuit 1 are shaped by a waveform shaping circuit 35 and converted to voltage by a frequency-to-voltage (F/V) converter 36. The output voltage of the converter 36 is sent to and compared with reference voltages by comparators 37 and 38. When the engine speed is higher than a low idling speed $N_1$ after the engine is started, the output I of the comparator 37 is at a high level. When the engine reference speed is higher than a speed $N_2$ during cranking of the engine, the output of the comparator 38 is at a high level. The output of the comparator 37 is applied to a NAND 39, and the output of the comparator 38 is applied to the NOR gate 22.

The NAND gate 39 is applied with a low output by the grounding of the terminal 10. Output of the NAND gate 39 is connected to an input of an OR gate 33 and also connected to an input of an exclusive OR gate 40. The output of the exclusive OR gate 40 is applied to a monostable multivibrator 42 through a differentiation circuit 41 to produce an output IV for a predetermined time (Tsec). The output of the monostable multivibrator 42 is applied to the OR gate 33. During the driving of the vehicle, the terminal 10 is disconnected from the ground. Therefore, voltage at the input II of the NAND gate 39 is at a high level and the output III of the NAND gate 39 is at a low level when the engine speed is higher than the low idling speed $N_1$. Therefore, the exclusive OR gate 40 produces a high level output which is differentiated by the differentiator 41, thereby to operate the monstable multivibrator 42. The multivibrator 42 produces an output for a predetermined time (Tsec), which is applied to the AND gate 32 through the OR gate 33.

In normal state of the starter operation switch 6, the output of the switch is at a high level during cranking of the engine. Accordingly, the output of the NOR gate 22 is at a low level irrespective of the output level of the comparator 38. The low level output of the NOR gate 22 is applied to the counter 30 through the inverter 26 and AND gate 25. Therefore, the output of the counter 27 is at a low level, so that the warning lamp 15 is not lighted.

When failure occurs in the switch 6 and the output thereof is at a low level during the cranking, the output of the NOR gate 22 is during a high level at the operation of the starter, because of the low level of the output of comparator 38. Accordingly, the counter 27 produces a high level output which is applied to the AND gate 32. Since the AND gate 32 is opened for a predetermined time (Tsec), the output of the counter 27 operates the driver 18c to light the lamp 15 for the time. Thus, the driver is surely informed of the failure.

In diagnosis at a shop, the terminal 10 is grounded, so that the output thereof becomes low. Since the output I of the comparator 37 is at a low level during the cranking, the output III of the NAND gate 39 is at a high level. The high level output of the NAND gate 39 is applied to the AND gate 32 through the OR gate 33. On the other hand, if the switch 6 fails to produce its high level output, the failure is diagnosed by the diagnosing circuit 21 as described above. Therefore, the output of the counter 27 caused by the failure is applied to the driver 18c through AND gate 32 to light the lamp as long as the cranking countinues.

In FIG. 3, references I to VIII show positions in the circuit of FIG. 2 and H and L indicate a high level and a low level signal at the positions, respectively.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. In a system for diagnosing an internal combustion engine having a starter and a starter switch effective to produce a starter signal dependent on the operation of the starter switch, and first means for generating an engine speed signal dependent on engine speed, the improvement comprising
    a first comparator responsive to the engine speed signal for detecting the engine speed during cranking of the engine and producing a cranking signal;
    starter operation diagnosing circuit means responsive to the starter signal of said starter switch for producing a failure output when an absence of the starter signal during a presence of the cranking signal continues for a predetermined period;
    a second comparator for producing an engine operating signal when the engine speed signal exceeds idling speed;
    a terminal for grounding a circuit and for producing a grounding signal during the grounding;
    first gate means responsive to said engine operating signal of said second comparator and to the grounding signal for producing a first signal having a first logic level during the presence of the grounding signal and a second signal having a different, second logic level during the absence of the grounding signal and during the presence of the engine operating signal;
    second means responsive to the second signal having the second logic level for producing a third signal;
    second gate means for providing a fourth signal upon occurrence of said failure output of said starter operation diagnosing circuit means and the first signal having the first logic level and respectively said second signal; and
    warning means operated by said fourth signal from said second gate means.

2. The system according to claim 1, wherein said second means is for producing said third signal for a predetermined time.

3. The system according to claim 1, wherein said second means comprises:
    means for producing a fifth signal in response to said second signal when ignition pulses occur;
    means for differentiating said fifth signal;
    means comprising a monostable multivibrator for producing for a predetermined time said third signal upon differentiating said fifth signal.

* * * * *